United States Patent [19]

Kawanishi et al.

[11] Patent Number: 4,930,256
[45] Date of Patent: Jun. 5, 1990

[54] METHOD OF SMOOTHING THE OUTER SURFACE OF A STRUCTURE WITH SLIDING DOORS AND A SLIDING DOOR WITH A MECHANISM FOR SMOOTHING THE OUTER SURFACE

[75] Inventors: Isamu Kawanishi; Makoto Ogawara, both of Hyogo, Japan

[73] Assignee: Kawassaki Jukogyo Kabushiki Kaisha, Hyogo, Japan

[21] Appl. No.: 239,243

[22] Filed: Sep. 1, 1988

[51] Int. Cl.$^5$ .............................................. E05D 15/10
[52] U.S. Cl. ........................................ 49/209; 105/1.1
[58] Field of Search ................. 49/360, 209, 477, 169, 49/219, 449

[56] References Cited

U.S. PATENT DOCUMENTS 3,218,679 11/1965 Soddy .
3,383,798 5/1968 Day ........................................ 49/219
3,863,979 2/1975 Bienert ................................... 49/360
4,438,595 3/1984 MacDonald ........................... 49/219

FOREIGN PATENT DOCUMENTS 3244439 6/1983 German Democratic Rep. .
63-61677 3/1988 Japan .

OTHER PUBLICATIONS

ZEV-Glas. Ann. 110 (1986), No. 6/7 Juni/Juli, pp. 250, 255, and 256.

Primary Examiner—Kenneth J. Dorner
Assistant Examiner—Gerald A. Anderson
Attorney, Agent, or Firm—Schwartz & Weinrieb

[57] ABSTRACT

A method of smoothing the outer surfaces of sliding doors wherein, after a doorway is closed with a sliding door, a wall member is projected outwardly, the outer wall member having an outer surface of a size and shape which is nearly the same as those of the doorway, such that the surface of the outer wall member is flush with the surface of the structure.

20 Claims, 5 Drawing Sheets

METHOD OF SMOOTHING THE OUTER SURFACE OF A STRUCTURE WITH SLIDING DOORS AND A SLIDING DOOR WITH A MECHANISM FOR SMOOTHING THE OUTER SURFACE

BACKGROUND OF THE INVENTION

1. Field of the Invention

The present invention relates to a sliding door disposed within a doorway of high speed transport vehicles and the like whose outer surface must be very smooth or stream-lined so as to decrease the air resistance upon the outer surface of the structure.

2. Background of the Invention

According to the conventional structure with sliding doors, as shown in FIG. 10, a sliding door D reciprocally moves along the inside of a door pocket A. When moving toward the left, the sliding door D comes into contact with a stopper S comprising a buffer member so as to close the doorway O.

Therefore, the sliding door D which is closed inevitably develops a step of a size l relative to the door pocket A so as to produce a large amount of air resistance when the moving member runs at high speeds.

In high speed vehicles such as for example, the Shinkansen-rail way, sub-ways, mono-rail cars and the like in particular, it is an important requirement to decrease the air resistance, to decrease the running resistance and, hence to effectively use the vehicle power. This tendency becomes more important as the running speed increases.

The air resistance upon the surface of the structure such as, for example, the car body can be reduced very effectively by smoothing the outer surface of the structure. With the conventional sliding door structure, however, it is not possible to eliminate the step defined between the door pocket and the sliding door of the structure, and it is not possible to minimize the air resistance by smoothing the outer surface of the structure.

There has heretofore been proposed a plug-type door for smoothing the outer surface of a vehicle body. However, the plug-type door is generally moved manually and must be, as a whole, moved in two steps, that is, in a direction in which the door is closed and in a direction at right angles therewith and, the movement is generally made upon a continuous curve so that a complex structure is required for limiting the motion of the door and controlling it remotely.

Furthermore, when the presently employed sliding door structure having a step defined between the door pocket and the sliding door is intended to be modified into the plug-type door system, it requires great modification which is virtually impossible to carry out.

OBJECT OF THE INVENTION

The present invention is accomplished in order to solve such problems.

SUMMARY OF THE INVENTION

The present invention is concerned with a method of smoothing the outer surface of the body of transport vehicles, namely aligning the outer surface of a sliding door with the outer surface of the vehicle body structure wherein, after the sliding door is closed, an outer wall member is projected relative to the sliding door, the outer wall member having a size and shape which is nearly the same as those of the doorway, such that the outer surface of the outer wall member is flush with the outer surface of the car body.

The present invention is further concerned with a sliding door having a mechanism for smoothing the outer surface of a vehicle body structure, with the sliding door comprising a sliding door body which has an opening defined at a position corresponding to a doorway of the structure when the doorway is closed by means of the sliding door, an outer wall member which has an outer surface of a size and shape nearly equal to those of the doorway and which is retractably movable with respect to the opening of the sliding door body, and an outer wall member moving device which is mounted upon the sliding door body and which works in such a manner that the outer member is projected until it becomes flush with the surface of the structure or that the outer wall member is retracted into the sliding door body.

The sliding door is comprised of a sliding door body, an outer wall member, and an outer wall member device which is mounted upon the sliding door body such that the outer wall member is projected or retracted relative to the sliding door body. When the sliding door is closed, the outer wall member is projected by means of the outer wall member moving device, whereby the outer surface of the member becomes flush with the surface of the structure and the air resistance is minimized when the vehicle moves.

When the sliding door is opened, the outer wall member retracts into the sliding door body as a result of the operation of the outer wall member moving device. Therefore, the sliding door body and the outer wall member do not interfere with the door pocket even when the sliding door is opened and closed.

BRIEF DESCRIPTION OF THE DRAWINGS

Various others objects, features, and attendant advantages of the present invention will be more fully appreciated from the following detailed description when considered in connection with the accompanying drawings, in which like reference characters designate like or corresponding parts throughout the several views, and wherein.

DESCRIPTION OF THE PREFERRED EMBODIMENTS

Embodiments of the present invention will now be described in conjunction with the drawings.

Figure 1:
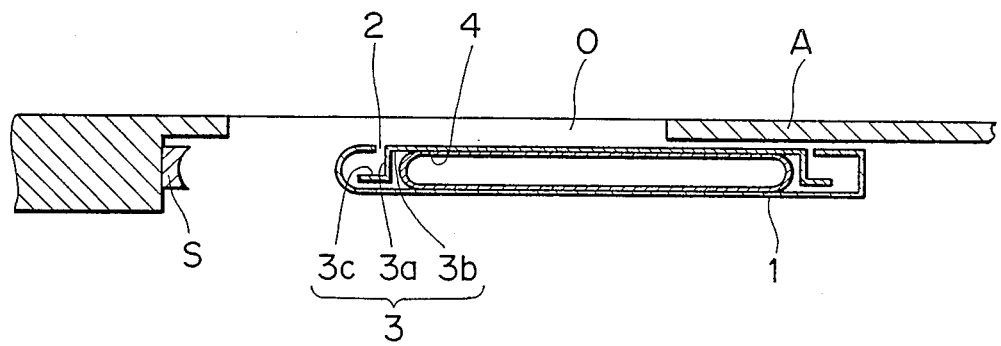
FIG. 1 is a lateral section view of a sliding door when the door is opened according to a first embodiment of the present invention.
Figure 2:
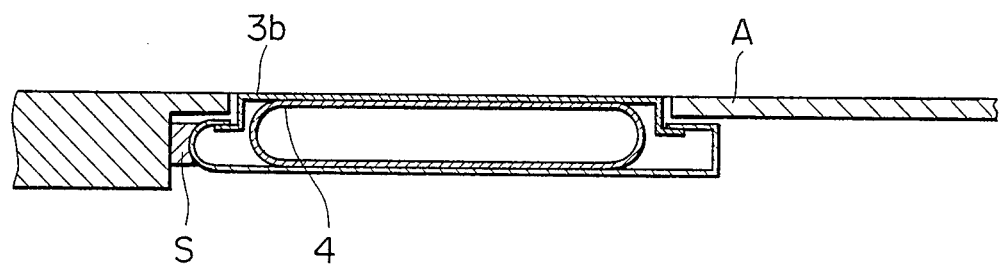
FIG. 2 is a lateral section view of the sliding door when the door is closed according to the first embodiment of the present invention.
Figure 3:
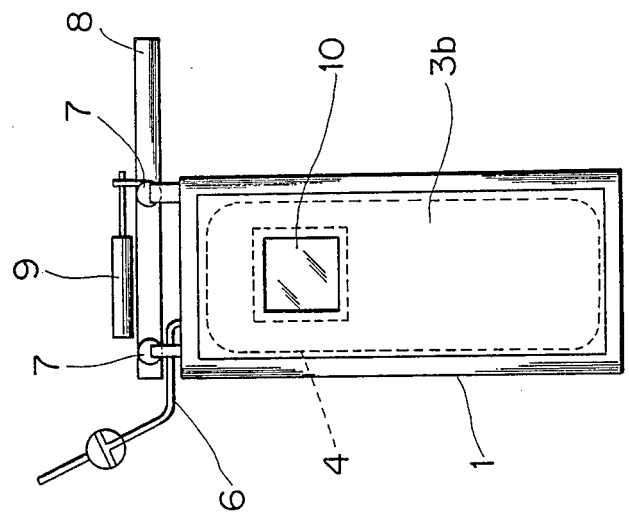
FIG. 3 is a front view showing the inside of the sliding door according to the first embodiment of the present invention.

FIGS. 1 to 3 are lateral section views illustrating a sliding door and part of the structure according to a first embodiment of the present invention, wherein a sliding door body 1 moves reciprocally along the inside of a door pocket A similar to a conventional sliding door, and moves in the leftward direction in FIG. 1 so as to come into contact with a stopper S which is composed of a buffer material so as to close the doorway O. This embodiment, however, is different from the conventional sliding door in that the sliding door body 1 is provided with an opening 2 having a size and shape nearly the same as those of the doorway O at a position that corresponds to the doorway O when the sliding door body 1 is closed.

Within the sliding door body 1 there is loosely disposed an outer wall member 3 that projects and retracts relative to the opening 2 and accordingly the doorway O.

The outer wall member 3 comprises a peripheral wall 3a that defines a small gap relative to the opening 2, an outer wall 3b connected to one end of the peripheral wall 3a, and a flange 3c provided at the other side of the peripheral wall 3a.

An air bag 4 having substantial resiliency is inserted between the outer wall 3b and the sliding door body 1, and both surfaces of the air bag 4 are fastened to the inner surfaces of the outer wall 3b and the sliding door body 1.

A supply/exhaust pipe 6 is installed upon the upper portion of the sliding door body 1 as shown in FIG. 3, one end of the supply/exhaust pipe 6 being fluidically communicated with the air bag 4, while the other end thereof is fluidically communicated with a switching valve (not shown) so that compressed air is supplied to the supply/exhaust pipe 6 from the source of compressed air used for the which brake and the like by means of the switching valve.

The outer wall member moving device therefore comprises the air bag 4 and the supply/exhaust pipe 6.

Door rollers 7 provided at the upper end of the sliding door body 1 are supported by means a rail 8 disposed above the sliding door, and the sliding door body 1 is opened and closed by means of a sliding door opening/closing cylinder 9.

Reference numeral 10 denotes a glass window provided within the sliding door, and the air bag 4 may be provided with a cavity at the center thereof so that the view through the glass window 10 will not be blocked.

Described below is a method of aligning the outer surface of the sliding door with that of the structure such as, for example, the car body employing the sliding door constructed in accordance with the present invention.

When the sliding door is being opened, the intake air is interrupted by means of the switching valve, and the air within the air bag 4 is communicated with the open air.

Therefore, the air bag 4 is deflated, and the outer wall member 3 is retracted into the sliding door body 1 (see FIG. 1).

Under this condition, if the cylinder 9 is operated so as to bring the sliding door body 1 into contact with the stopper S, then the doorway O is closed.

Next, if are connections made to the source of compressed air through means of the switching valve so as to inflate the air bag 4, the outer wall member 3 projects outwardly until flange 3c comes into contact with the peripheral portion of the door body, defining opening 2 of the sliding door body 1 as shown in FIG. 2, and the outer wall 3b of the outer wall member 3 becomes flush with the surface of the car body. The outer wall 3b has a size and shape which is nearly the same as those of the doorway O. Therefore, when the doorway O is closed by means of the outer wall member 3 or its outer wall 3b, the outer surface of the sliding door of the vehicle is aligned with that of the car body.

Figure 6:
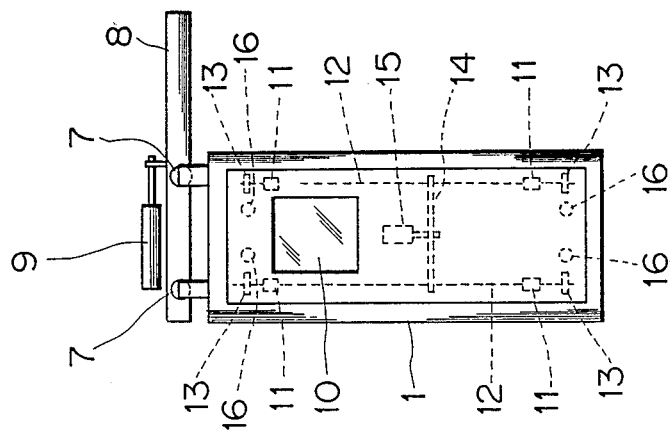
FIG. 6 is a front view showing the inside of the sliding door according to the second embodiment of the present invention.
Figure 4:
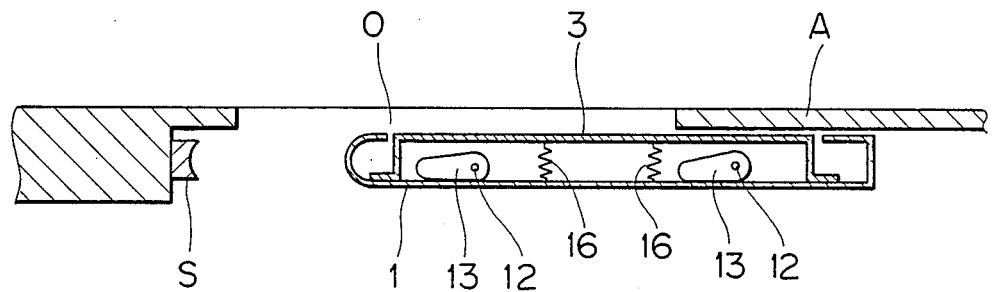
FIG. 4 is a lateral section view of the sliding door when the door is opened according to a second embodiment of the present invention.
Figure 5:
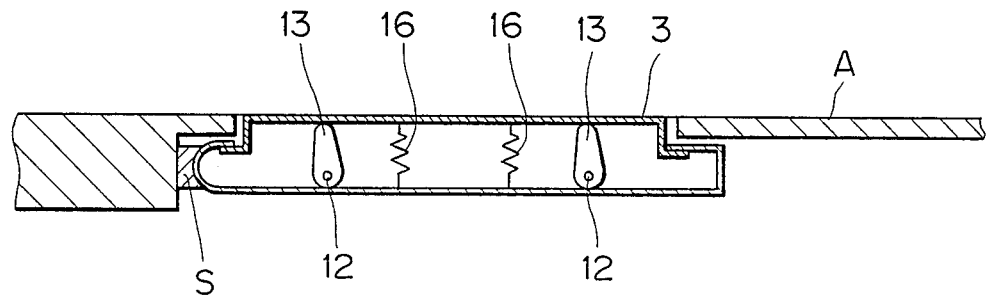
FIG. 5 is a lateral section view of the sliding door when the door is closed according to the second embodiment of the present invention.

FIGS. 4 to 6 illustrate a second embodiment of the present invention where the sliding door body 1 and the outer wall member 3 have the same structures as those of the first embodiment but the outer wall member moving device is different from that of the first embodiment.

That is, cams 13 are secured at a plurality of locations upon two shafts 12 rotatably supported by means of bearings 11 that are secured to the sliding door body 1.

The two shafts are turned by means of a motor 15 through means of a rotation transmission mechanism 14.

Reference numeral 16 denotes springs that extend between the sliding door body 1 and the outer wall member 3, and which bias the member 3 toward the sliding door body 1.

Described below is the function of the outer sliding door moving device constructed according to the second embodiment of the present invention.

As the motor 15 rotates by means of a predetermined amount, the shafts 12 are rotated by means of the rotation transmission mechanism 14, whereby the cams 13 that had been disposed as shown in FIG. 4 are now erected as shown in FIG. 5. Therefore, the outer wall member 3 projects outwardly against the biasing force of the springs 16 so as to be flush with the surface of the structure.

In order to open the sliding door, the cams 13 are turned in the reverse direction; that is, the outer wall member 3 retracts into the sliding door body 1 under the influence of the springs 16, and the sliding door can be opened without interference with the door pocket A.

In regard to other features of the door system, the second embodiment is the same as the first embodiment.

Figure 7:
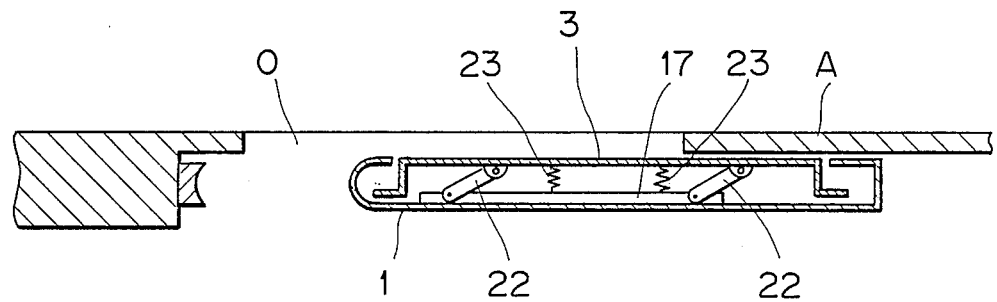
FIG. 7 is a lateral section view of the sliding door when the door is opened according to a third embodiment of the present invention.
Figure 8:
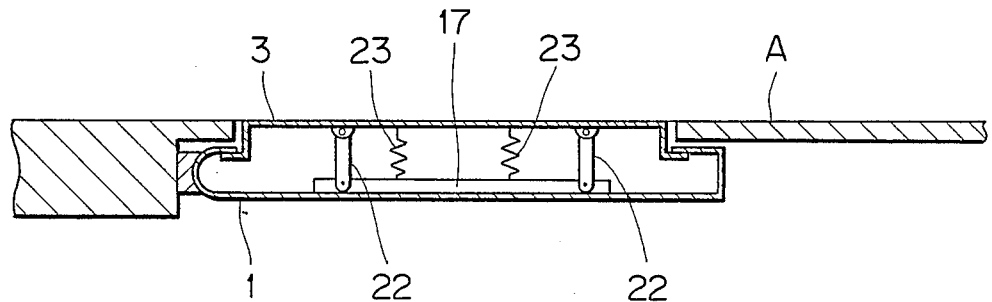
FIG. 8 is a lateral section view of the sliding door when the door is closed according to third embodiment of the present invention.
Figure 9:
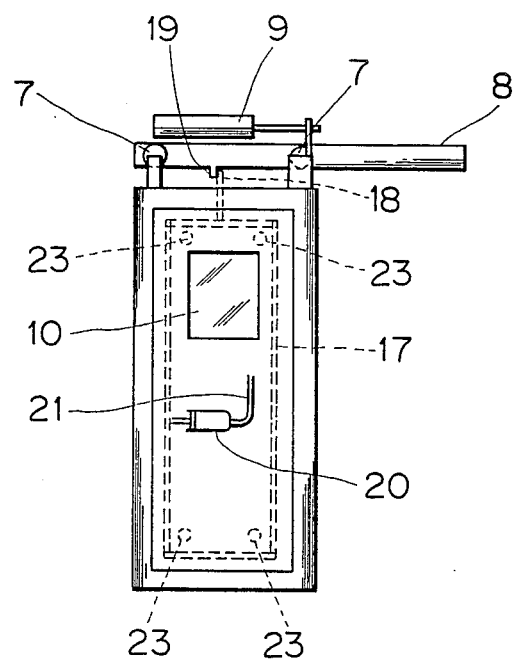
FIG. 9 is a front view showing the inside of the sliding door according to the third embodiment of the present invention.
Figure 10:
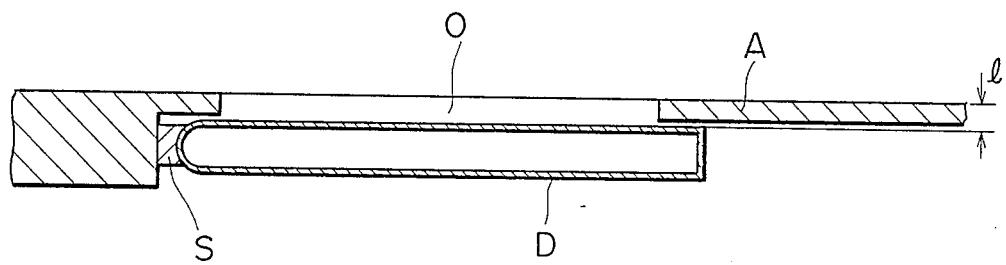
FIG. 10 is a lateral section view of a sliding door according to the prior art.

FIGS. 7 to 9 illustrate an outer sliding door moving device constructed according to a third embodiment, wherein the sliding door body 1 is provided upon the inner wall thereof with a link support plate 17 in such a manner that it is allowed to slide toward the right and left.

Referring to FIG. 9, a metal fitting coupling 18 that projects outwardly beyond the sliding door body 1 is fixedly connected to the upper portion of the link support plate 17. When the sliding door body 1 is moved in the direction of being closed, the metal fitting coupling 18 comes into contact with a stopper 19 that projects downwardly from the lower surface of the sliding door rail 8, and the link support plate 17 slides along the inner wall surface of the sliding door body 1 which is being driven by means of a support plate moving device.

Here, the support plate moving device may be so constructed that the link support plate 17 undergoes its sliding movements as a result of being driven directly by means of an air cylinder 20.

Reference numeral 21 denotes a supply/exhaust pipe which communicates the source of compressed air with the air cylinder 20 by means of the switching valve.

An end of a link 22 is pivoted to the link support plate 17 and the other end of the link 22 is pivoted to the inner wall surface of the outer wall member 3.

Referring to FIG. 7, therefore, as the link support plate 17 is slid toward the left along the inner surface of the sliding door body 1, the links 22 become inclined and the outer wall member 3 is retracted into the sliding door body 1. As the link support plate 17 returns to the condition shown in FIG. 8, the outer wall member 3 projects outwardly so as to define a plane which is flush with the surface of the structure.

Springs 23 are extended between the sliding door body 1 and the outer wall member 3 so as to bias the outer wall member 3 toward the retracted position.

Described below is the function of the outer door moving device constructed according to the third embodiment of the present invention.

When the sliding door body 1 is opened, the outer wall member 3 is retracted into the sliding door body 1 under the influence of the springs 23, and the link support plate 17 has been slid to the left along the inner wall surface of the sliding door body 1 (see FIG. 7).

As the sliding door opening/closing cylinder 9 is actuated so as to move the sliding door body 1 toward the left, the metal fitting coupling 18 comes into contact with the stopper 19 just before the sliding door body is closed. Therefore, the link support plate 17 moves toward the right with respect to the sliding door body 1, whereby the links 22 are erected, the outer wall member 3 projects outwardly against the biasing force of the springs 23, and a plane is formed by means of outer wall member 3 that is flush with the surface of the structure.

The link support plate 17 may be moved toward the right as a result of being driven directly by means of the air cylinder 20 instead of being driven by means of the contact engagement between the metal fitting coupling 18 and the stopper 19.

As described above, the outer sliding door moving device may be constructed in a variety of ways provided the outer wall member 3 is projected outwardly so as to be flush with the surface of the structure and is retracted into the sliding door body 1.

According to the present invention, the step is eliminated between the sliding door and the surface of the structure, and the outer surfaces are, in effect, rendered continuous, by forming an opening within the sliding door which is of the same type as that of the traditional sliding door, by providing an outer wall member that projects out from the opening and retracts thereinto, and by providing an outer wall member moving device for protruding or retracting the outer wall member. Therefore, the air resistance can be decreased when a vehicle runs at high speeds and its power can be efficiently utilized. Furthermore, noise such as wind noise can be suppressed. In addition, the structure exhibits an improved appearance.

The sliding door body is described above as having a shape which is rectangular and having a plate-like box having a rectangular opening upon the outer side face thereof. However, the opening is not obligatorily necessary within the sliding door body. The sliding door may alternatively comprise a sliding door body having an inner plate and a guide member fixed to the outer face of the sliding door body along the line corresponding to the opening within the above first embodiment. The guide members support and guide the outer wall member projecting outwardly and retracting inwardly through the doorway of the structure.

Furthermore, the inner plate within the sliding door body is not an absolutely necessary component of the sliding door constructed according to this invention. The sliding door body may consist of only a framework structure, since the doorway can be closed by means of the outer wall member only. Of course, the inner plate is important in view of strengthening the structure and providing for safe and comfortable conditions within the interior of the car.

The sliding door of existing structures can be replaced by means of the sliding door of the present invention with minor modifications so as to easily smooth the outer surfaces of the structures. Examples of the structures to which the present invention can be applied include automobiles, ships, aircraft, and buildings, in addition to high speed vehicles described in the embodiments.

The moving structures operating under high speed conditions obtain the most favorable effect from the view point of fluid mechanics, when they are supplied with the present invention. However, a static or stationary structure such as, for example, a building, receives a graceful appearance from the principles of this invention, because it is considered that skillful architects can design attractive buildings with smooth outer walls according to this invention.

Obviously, many modifications and variations of the present invention are possible in light of the above teachings. It is therefore to be appreciated that within the scope of the appended claims, the present invention may be practiced otherwise than as specifically described herein.

What is claimed is:

1. A door system, comprising:
   a fixed structure having means defining a doorway therein, and an outer surface;
   a door body slidably disposed, with respect to said doorway of said fixed structure, between first open and second closed positions;
   means defining an opening within said door body for alignment with said doorway of said fixed structure when said door body is disposed at said second closed position;
   an outer wall member movably disposed upon said door body between first projected and second retracted positions with respect to said opening of said door body, and including an outer surface having a size and shape substantially corresponding to that of said doorway such that when said door body is disposed at said second closed position and said outer wall member is disposed at said first projected position, said outer surface of said outer wall member will be disposed substantially flush with said outer surface of said fixed structure; and
   air bag means mounted upon said door body and interposed between said door body and said outer wall member for moving said outer wall member between said projected and retracted positions when said air bag means is inflated and deflated, respectively.

2. A door system as set forth in claim 1, wherein:

said fixed structure comprises a building wall.

3. A door system as set forth in claim 1, wherein:
said fixed structure comprises a wall of a vehicle.

4. A door system as set forth in claim 1, wherein:
said door body is slidably disposed within a plane which is disposed parallel to a plane within which said outer surface of said fixed structure is disposed.

5. A door system as set forth in claim 1, wherein:
said outer wall member is movable in a direction which is substantially perpendicular to a plane within which said outer surface of said fixed structure is disposed.

6. A door system as set forth in claim 4, wherein:
said outer wall member is movable in a direction which is substantially perpendicular to said plane within which said door body is slidably disposed.

7. A door system as set forth in claim 1, further comprising:
rail means fixedly disposed upon said fixed structure; and
roller means mounted upon said door body and disposed upon said rail means of said fixed structure for facilitating said slidable movement of said door body with respect to said doorway of said fixed structure.

8. A door system as set forth in claim 1, further comprising:
fluidic piston-cylinder means operatively connected to said sliding door body for moving said sliding door body between said first open and second closed positions.

9. A door system as set forth in claim 1, further comprising:
compressed air supply means operatively connected to said air bag means for inflating and deflating said air bag means.

10. A door system as set forth in claim 1, further comprising:
stopper means fixedly mounted upon said fixed structure for engaging said sliding door body when said sliding door body is moved to said second closed position.

11. A door system as set forth in claim 1, further comprising:
window means defined within door body and said outer wall member; and
cavity means defined within said air bag means at a position corresponding to said window means of said door body and said outer wall member so as to permit uninterrupted viewing through said window means.

12. A door system as set forth in claim 1, wherein:
said outer wall member includes peripheral flange means for engaging said means defining said opening within said door body so as to limit the movement of said outer wall member with respect to said door body when said outer wall member is moved from said second retracted position to said first projected position.

13. A method of smoothing an outer surface of a fixed structure, having a doorway defined therein, by means of a door body slidable between first open and second closed positions with respect to said doorway of said fixed structure, comprising the steps of:
providing an opening within said door body at such a position that said opening will be substantially aligned with said doorway of said fixed structure when said door body is disposed at said second closed position;
disposing an outer wall member upon said door body such that said outer wall member is movable between first projected and second retracted positions with respect to said opening of said door body, and providing said outer wall member with an outer surface having a size and shape which substantially corresponds to that of said doorway of said fixed structure such that when said door body is moved to said second closed position and said outer wall member is moved to said projected position, said outer surface of said outer wall member will be disposed substantially flush with said outer surface of said fixed structure;
providing an air bag upon said door body such that said air bag is interposed between said door body and said outer wall member and is therefore capable of moving said outer wall member between said first projected position and said second retracted position when said air bag is inflated and deflated, respectively;
moving said door body from said first open position to said second closed position while said air bag is deflated and said outer wall member is disposed at said second retracted position; and
inflating said air bag after said door body is disposed at said second closed position so as to move said outer wall member of said door body from said second retracted position to said first projected position whereby said outer surface of said outer wall member will be disposed flush with said outer surface of said fixed structure.

14. A method as set forth in claim 13, further comprising the steps of:
subsequently deflating said air bag while said door body is disposed at said second closed position so as to move said outer wall member of said door body from said first projected position to said second retracted position; and
moving said door body from said second closed position to said first open position so as to open said doorway of said fixed structure.

15. A method as set forth in claim 13, wherein:
said doorway is defined within a building-type fixed structure.

16. A method as set forth in claim 13, wherein:
said doorway is defined within a vehicle-type fixed structure.

17. A method as set forth in claim 13, wherein:
said door body is moved within a plane which is disposed parallel to a plane within which said outer surface of said fixed structure is disposed.

18. A method as set forth in claim 17, wherein:
said outer wall member is moved in a direction which is substantially perpendicular to said plane within which said door body is moved.

19. A method as set forth in claim 13, further comprising the steps of:
providing rail means upon said fixed structure; and
providing roller means upon said door body for rollably engaging said rail means of said fixed structure so as to movably support said door body between said first open and second closed positions.

20. A method as set forth in claim 13, further comprising:
providing said outer wall member with peripheral flange means for engaging a peripheral portion of said door body defining said opening therein so as to limit the movement of said outer wall member with respect to said door body when said outer wall member is moved from said second retracted position to said first projected position.

* * * * *